Patented Aug. 26, 1930

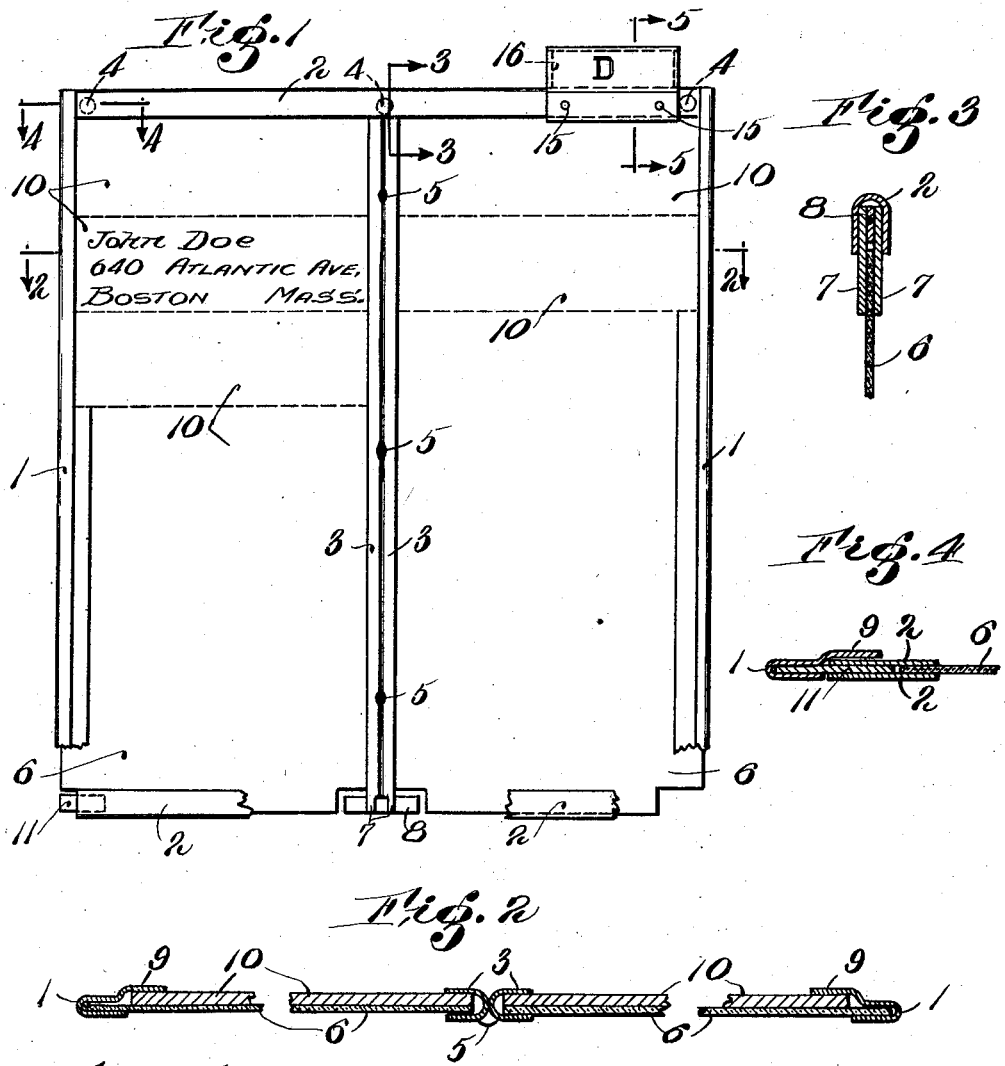

1,774,241

UNITED STATES PATENT OFFICE

JAMES H. RAND, OF NORTH TONAWANDA, NEW YORK, ASSIGNOR, BY MESNE ASSIGN-MENTS, TO REMINGTON RAND INC., OF NEW YORK, N. Y., A CORPORATION OF DELAWARE

INDEX HOLDER

Application filed June 14, 1924. Serial No. 719,933.

This invention relates to index holders of the type adapted to be held in drawers or trays like loose card indices, or to be pivoted on frames to swing about either their side or end edges, or to be used individually as reference panels; objects of the invention being to provide holders which can display the same index slips and labels from either side, which have a transparent front covering for the index slips, which are economical in construction and durable in use, which can be made stiff and comparatively rigid without being thick or heavy, and which do not catch upon each other or upon other contacting parts when slipped therealong as when slipping them into or out of drawers between other closely packed holders.

The salient characteristics of the invention are illustrated by a single concrete example in the accompanying drawings in which:—

Fig. 1 is a front elevation of the index holder with parts broken away;

Fig. 2 is an enlarged section on line 2—2 of Fig. 1;
Figs. 3, 4 and 5 are enlarged detail sections on the lines 3—3, 4—4, and 5—5 of Fig. 1 respectively;

Fig. 6 is a perspective view of the folded index label; and Fig. 7 is a similar view of a modified form of label.

The particular embodiment of the invention shown in the drawings comprises a rectangular metallic framework consisting of side channel members 1, end reinforcing channel members 2, and central channel members 3. The channel members are integrally joined together at their junctions, preferably by spot welding, as indicated by the dotted circles 4 in Fig. 1, and the two central members 3 may be soldered together at intervals as indicated at 5. The side and end channels face inwardly and the central channels 3 face outwardly, and sheets 6 of celluloid or other transparent material are fitted into the opposing channels of the various members.

As shown in Figs. 1 and 2 the backs of the channel members 3 are cut away at the ends to provide four tabs 7, two on each end of each of the members 3. Extending between these tabs is a metallic strip 8 which is preferably joined to the members 3 by spot welding. The corners of the celluloid sheet 6 are cut away to accommodate the strip 8. The end channel 2 covers the tabs 7 and strip 8 and is preferably spot welded to the parts 7 and 8. This welding is preferably effected after the parts are assembled so that parts 2, 7 and 8 are all welded together by a single spot welding operation at the junction of these parts.

As shown in Figs. 1 and 4 the side channels 1 overlap the celluloid sheet 6 farther on the back than on the front, and the rear flanges 9 of the side pieces are offset as shown in Fig. 4 to accommodate the rear sides of the end channels 2 and also to receive the ends of the slips 10 bearing the index indicia, these slips preferably being mounted on the back of the panel so that their front faces are covered by the celluloid sheets. A short metallic strip 11 is preferably inserted in the channels of the side and end members at the corners of the panel (Fig. 4), the strip extending horizontally and having a width slightly less than the depth of the channels in the end members 2. This strip is preferably spot welded to the flanges of the end member 2 and to the rear flange 9 of the side member 1, as indicated by the dotted circle in Fig. 1.

The tab holder shown in Figs. 1 and 5 comprises a sheet of celluloid 12 folded at 13 and having its ends extending along the opposite sides of the upper end channel 2. A U-shaped clip 14 preferably of thin sheet copper, is provided on each end of the celluloid sheet 12, one end of each clip having a portion fitting into the channel member 2 and the other end overlapping the end of the celluloid sheet. The parts may be secured together in any suitable manner, copper rivets 15 being shown for the purpose.

The index labels, which are inserted into the pocket formed by the folded celluloid sheet 12, may be of various forms, but two preferred forms are shown in Figs. 6 and 7. The label 16 shown in Fig. 6 comprises a sheet of paper folded horizontally in the middle, the dimensions of the sheet being such that when thus folded, the label will substantially fill the celluloid pocket as shown in Figs. 1 and 5. Instead of folding the label horizontally, it may be folded vertically as shown in Fig. 7, in which case the shape of the unfolded blank is of course different.

By virtue of the provision for mounting the slips on the back of the panel behind the celluloid windows, the indicia on the faces of slips 10 is protected by the celluloid. Moreover the slips may display indicia on their backs as well as the fronts. This indicia may be either a duplicate of the indicia on the front or may comprise different indicia. In many situations it is desirable to display the same indicia from either side of the panel, as for example in cases where different operators use the index from opposite sides of a table or desk. By virtue of the folded label the index indicia may be written on one side thereof before it is folded thereby facilitating the application of the indicia.

I claim:—

1. An index holder comprising opposed channels for holding the opposite ends of a series of aligned index slips so that both sides of the slips are displayed and reinforcing means extending between said channels at the top and bottom of the holder.

2. An index holder comprising channels, connecting members at the tops and bottoms of the channels with a continuous space therebetween adapted to hold a series of index slips with both sides of the slips displayed.

3. An index holder comprising opposed channels adapted to hold the opposite ends of a series of index slips with both sides of the slips displayed, and a sheet of celluloid having its opposite edges disposed in said channels.

4. An index holder comprising opposed channels adapted to hold the opposite ends of a series of index slips with both sides of the slips displayed, cross-pieces interconnecting the ends of said channels, and a sheet of celluloid having its opposite edges disposed in said channels.

5. An index holder comprising an open rectangular frame formed of channels welded together at the corners, a sheet of celluloid having its margins disposed in said channel members respectively, and index slips mounted in edgewise alignment along one face of said sheet with their ends disposed in opposite channels.

6. An index holder comprising an open rectangular frame formed of channel members interconnected at the corners and a sheet of celluloid having its margins disposed in said channel members respectively.

7. An index holder comprising a channel frame, a sheet of material having its margins disposed in the channel of the frame, a folded tab straddling said frame from the outside, and clips straddling said frame from the inside for confining the ends of said tab.

Signed by me at Boston, Massachusetts, this 5th day of June, 1924.

JAMES H. RAND.